(12) United States Patent
Osada (10) Patent No.: US 11,573,752 B1
(45) Date of Patent: Feb. 7, 2023

(54) IMAGE PROCESSING APPARATUS, IMAGE FORMING APPARATUS, AND IMAGE FORMING METHOD THAT PERFORM COMPRESSION SUITABLE FOR THE STAGE OF IMAGE PROCESSING

(71) Applicant: KYOCERA Document Solutions Inc., Osaka (JP)

(72) Inventor: Yoshihiro Osada, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/497,296

(22) Filed: Oct. 8, 2021

(51) Int. Cl.
    *G06F 3/12* (2006.01)

(52) U.S. Cl.
    CPC ............ *G06F 3/122* (2013.01); *G06F 3/1206* (2013.01); *G06F 3/1253* (2013.01); *G06F 3/1285* (2013.01)

(58) Field of Classification Search
    CPC combination set(s) only.
    See application file for complete search history.

(56) References Cited

U.S. PATENT DOCUMENTS

| | | | |
|---|---|---|---|
| 9,860,427 B2 | 1/2018 | Chang et al. | |
| 2007/0076966 A1* | 4/2007 | Lee | H04N 1/41 358/1.15 |
| 2009/0190848 A1* | 7/2009 | Watanabe | H04N 19/146 358/1.16 |
| 2009/0297024 A1* | 12/2009 | Dai | G06V 30/413 382/199 |
| 2012/0050763 A1* | 3/2012 | Takeishi | H04N 1/642 358/1.9 |
| 2016/0077779 A1* | 3/2016 | Kim | H04N 1/642 358/1.9 |
| 2018/0167643 A1* | 6/2018 | Nagashima | H04N 1/64 |
| 2020/0098091 A1* | 3/2020 | Peterson | G06T 3/0093 |
| 2020/0394397 A1* | 12/2020 | Li | H04N 1/4072 |
| 2022/0169049 A1* | 6/2022 | Kuo | B41J 11/42 |

* cited by examiner

*Primary Examiner* — Helen Zong
(74) *Attorney, Agent, or Firm* — Hawaii Patent Services; Nathaniel K. Fedde; Kenton N. Fedde (57) ABSTRACT

Provided is an image processing apparatus that can efficiently utilize the storage capacity in image processing. A dividing unit divides inputted image data into a plurality of partial data. An analysis unit analyzes whether or not each of the plurality of partial data divided by the division unit is suitable for compression at any of a plurality of stages of image processing in which feature of image changes. A compression unit compresses the partial data at the stage when the analysis unit analyzes that it is suitable for compression. A decompressing unit decompresses the partial data compressed by the compression unit at the stage when it is compressed. A processing execution unit executes processing at the stage of image processing on the partial data decompressed by the decompressing unit.

19 Claims, 5 Drawing Sheets

IMAGE PROCESSING APPARATUS, IMAGE FORMING APPARATUS, AND IMAGE FORMING METHOD THAT PERFORM COMPRESSION SUITABLE FOR THE STAGE OF IMAGE PROCESSING

BACKGROUND

The present disclosure relates specifically to an image processing apparatus, an image forming apparatus, and an image forming method that perform compression in image processing.

There is an image forming apparatus such as a multifunctional peripheral (MFP) that can print documents and images.

The image forming apparatus handles a large amount of image data on a page-by-page basis when performing image processing to form an image on recording paper. Therefore, the storage area of a recording medium such as RAM, HDD, or the like, is required to be used, efficiently.

There is a typical technology that image data is compressed by lossy compression in units of m*n divided images (cells). This technology can provide a visual lossless compression technology specialized for image forming apparatus.

SUMMARY

An image processing apparatus according to the present disclosure is an image processing apparatus including: a division unit configured to divide inputted image data into a plurality of partial data; an analysis unit configured to analyze whether or not suitable for compression for each of the plurality of partial data divided by the divided unit in any one of plurality of stages of image processing where feature value of image changes; a compression unit configured to compress partial data at a stage when analyzed by the analysis unit as being suitable for compression; a decompression unit configured to decompress the partial data compressed by the compression unit at the stage when compressed; and a processing execution unit configured to execute processing at the stage of the image processing on the partial data decompressed by the decompression unit.

An image forming apparatus according to the present disclosure is an image forming apparatus including: a division unit configured to divide inputted image data into a plurality of partial data; an analysis unit configured to analyze whether or not suitable for compression for each of the plurality of partial data divided by the divided unit in any one of plurality of stages of image processing where feature value of image changes; a compression unit configured to compress partial data at a stage when analyzed by the analysis unit as being suitable for compression; a decompression unit configured to decompress the partial data compressed by the compression unit at the stage when compressed; a processing execution unit configured to execute processing at the stage of the image processing on the partial data decompressed by the decompression unit; and an image forming unit configured to collectively form an image of the partial data for which the processing at the stage has been completed.

An image processing method according to the present disclosure is an image forming method executed by an image processing apparatus, including the steps of: dividing inputted image data into a plurality of partial data; analyzing whether or not suitable for compression for each of divided plurality of partial data in any one of plurality of stages of image processing where feature value of image changes; compressing partial data at a stage when analyzed as being suitable for compression; decompressing compressed partial data at the stage when compressed; executing processing at the stage of the image processing on decompressed partial data; and collectively forming an image of the partial data for which the processing at the stage has been completed.

DETAILED DESCRIPTION

Embodiment

[System Configuration of Image Forming Apparatus 1]

Figure 1:
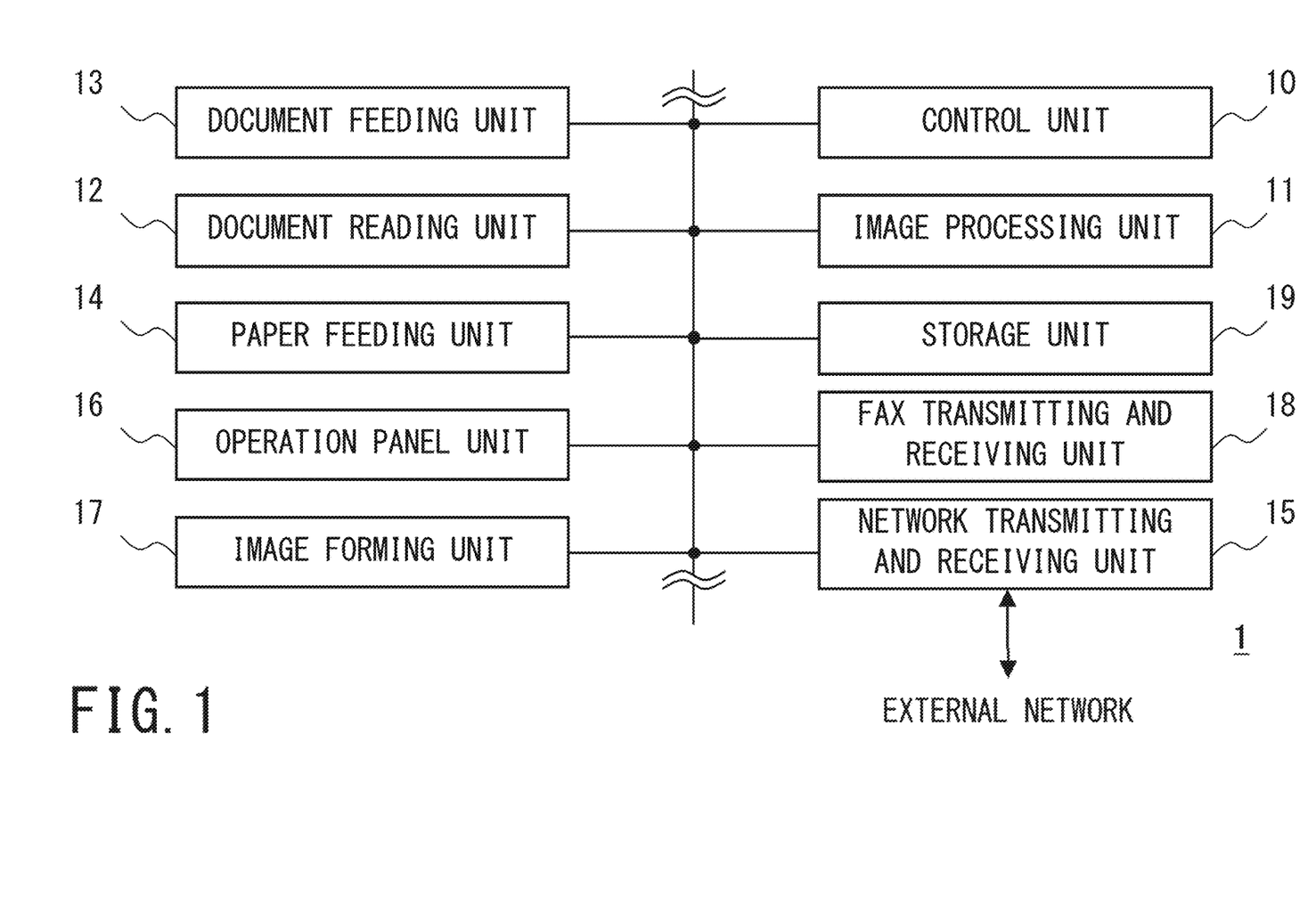
FIG. 1 is a system configuration diagram of an image forming apparatus according to an embodiment of the present disclosure.

Firstly, with reference to FIG. 1, a system configuration of an image forming apparatus 1 is described. The image forming apparatus 1 is a form of the image processing apparatus of the present disclosure.

The image forming apparatus 1 includes a control unit 10, an image processing unit 11, a document reading unit 12, a document feeding unit 13, a paper feeding unit 14, a network transmitting and receiving unit 15, an operation panel unit 16, an image forming unit 17, a fax transmitting and receiving unit 18, storage unit 19, and the like. Each unit is connected to the control unit 10 and its operation is controlled by the control unit 10.

The control unit 10 is an information processing unit such as a GPP (General Purpose Processor), a CPU (Central Processing Unit), an MPU (Micro Processing Unit), a DSP (Digital Signal Processor), a GPU (Graphics Processing Unit), an ASIC (Application Specific Integrated Circuit, a processor for specific applications), or the like. The control unit 10 reads out the control program stored in the ROM or HDD of the storage unit 19, expands the control program in the RAM, and executes it, so that the control unit 10 can be operated as each part of the functional block as described later. Further, the control unit 10 controls the entire apparatus according to instruction information input from an external terminal or an operation panel unit 16.

Figure 2:
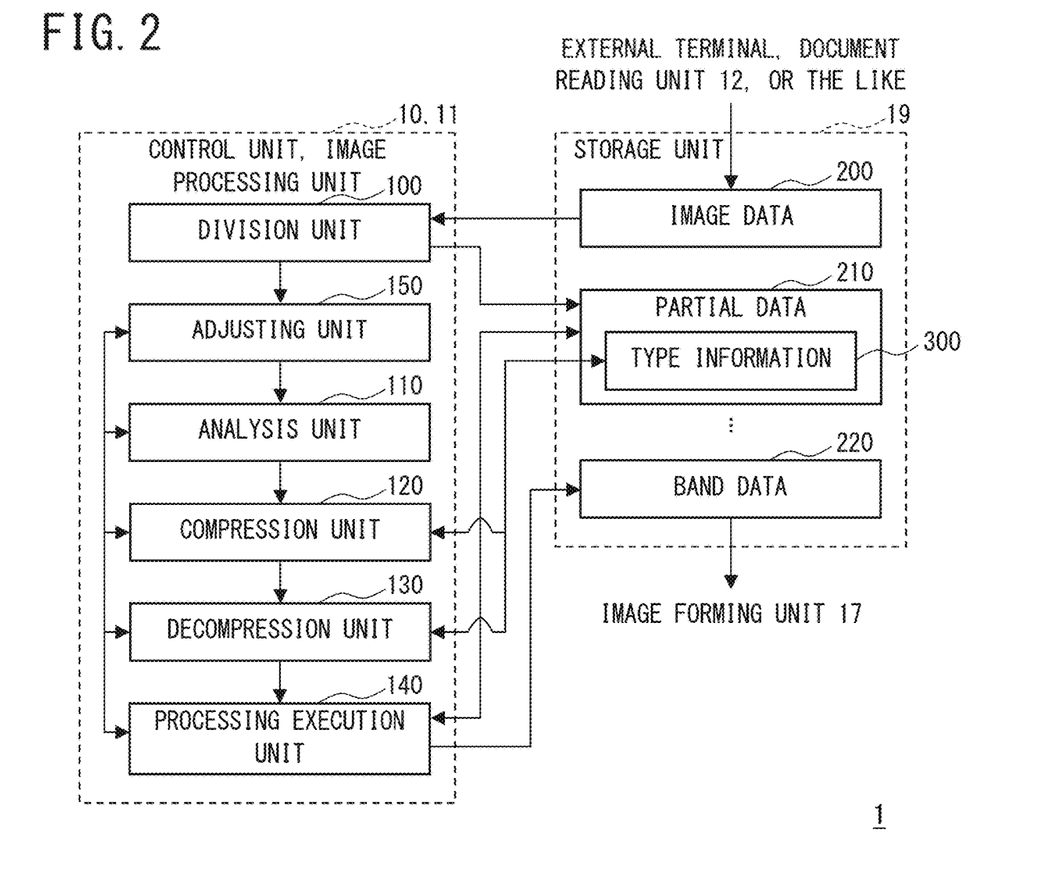
FIG. 2 is a block diagram showing a functional configuration of the image forming apparatus according to the embodiment of the present disclosure.

The image processing unit 11 is a control calculation unit such as a DSP (Digital Signal Processor), a GPU (Graphics Processing Unit), and an ASIC. The image processing unit 11 performs specified image processing on the image data 200 (FIG. 2). The specified image processing may be, for example, processing such as enlargement/reduction, density adjustment, gradation adjustment, and image improvement. In addition, the image processing unit 11 may be able to execute at least a part of RIP (Raster In Process. hereinafter, just referred to as "rasterize"). Further, the image processing unit 11 may be able to execute at least a part of the color conversion and an image processing at the halftone stage, which are described later. Therefore, the image processing unit 11 and the control unit 10 may have a relatively high-performance control calculation capability. Further, the image processing unit 11 stores the image read by the document reading unit 12 in the storage unit 19 as print data. At this time, the image processing unit 11 can also convert the print data into an electronic document such as PDF (Portable Document Format), or the like, or an image file such as TIFF, or the like. Further, the image processing unit 11 may be able to execute at least a part of OCR (Optical Character Recognition) processing.

The document reading unit 12 reads a set document. Further, the document reading unit 12 is arranged above the main body of the image forming apparatus 1.

The document reading unit 12 includes a scanner, platen glass, and a document reading slit. When reading a document placed on the platen glass, the document reading unit 12 moves the scanner to a position facing the platen glass, scans the document placed on the platen glass, and reads the image data 200. The document reading unit 12 stores the acquired image data 200 in the storage unit 19.

Further, the document reading unit 12 moves the scanner to a position facing the document reading slit when reading the document supplied from the document feeding unit 13. Then, the document reading unit 12 reads the document through the document reading slit in synchronization with the document transport operation by the document feeding unit 13 to acquire the image data 200. The document reading unit 12 stores the acquired image data 200 in the storage unit 19.

The document feeding unit 13 conveys the document read by the document reading unit 12. The document feeding unit 13 is arranged above the document reading unit 12.

The document feeding unit 13 includes a document placing unit and a document transporting mechanism. The document feeding unit 13 feeds the documents placed on the document placing unit to the document reading unit 12 one by one by the document transporting mechanism.

The paper feeding unit 14 feeds the recording paper one by one toward the image forming unit 17. The paper feed unit 14 is provided in the main body unit.

The network transmitting and receiving unit 15 is a network connection unit including a LAN board, a wireless transmitter/receiver, and the like, for connecting to an external network. The external network according to the present embodiment is, for example, a LAN, a wireless LAN, a WAN, a mobile phone network, a voice telephone network, or the like.

The network transmitting and receiving unit 15 transmits/receives data on a data communication line, and it transmits/receives a voice signal on a voice telephone line.

The operation panel unit 16 includes an input unit such as a button, a touch panel, or the like, and a display unit such as an LCD (Liquid Crystal Display), an organic EL (Electro Luminescence) display, or the like. Further, the operation panel unit 16 is arranged on the front side of the image forming apparatus 1.

The buttons of the input unit of the operation panel unit 16 are a numeric keypad, a start button, a cancel button, an operation mode switching button, a button for giving instructions related to job execution, and the like. In the present embodiment, the operation mode may include modes such as copying, fax transmission, scanner, network scanner, or the like. The jobs may also include printing, sending, saving, recording, or the like, for a selected document. The input unit of the operation panel unit 16 acquires instructions for various jobs of the image forming apparatus 1 from the user. It is also possible to input and change the information of each user according to the user's instruction acquired from the operation panel unit 16.

The image forming unit 17 forms an image on the recording paper from the data stored in the storage unit 19, read by the document reading unit 12, or acquired from the external terminal according to the output instruction of the user.

The image forming unit 17 includes a photoconductor drum, an exposure unit, a developing unit, a transfer unit, a fixing unit, and the like. The image forming unit 17 records a toner image on a recording paper by executing an image forming process including charging, exposure, development, transfer, and fixing.

The FAX transmitting and receiving unit 18 transmits/receives a facsimile. The FAX transmitting and receiving unit 18 receives a facsimile from another FAX apparatus via a voice line. The FAX transmitting and receiving unit 18 can store the FAX data in the storage unit 19 and cause the image forming unit to form an image. Further, the FAX transmitting and receiving unit 18 converts the image data 200 such as the document read by the document reading unit 12, the network FAX transmitted from the external terminal, or the like, into the FAX data. Then, the FAX transmitting and receiving unit 18 can facsimile-transmit the FAX data to another FAX apparatus via a voice line.

The storage unit 19 is a non-transitory recording medium such as a semiconductor memory of a ROM (Read Only Memory), a RAM (Random Access Memory), or the like, or an HDD (Hard Disk Drive). The RAM of the storage unit 19 may keep the stored contents by a function such as self-refresh even in a power saving state.

A control program for controlling the operation of the image forming apparatus 1 is stored in the ROM or HDD of the storage unit 19.

In the present embodiment, a temporary area for image storage (hereinafter, referred to as "image storage area") used before and after rasterization is secured in the RAM, HDD, and the like, of the storage unit 19. This image storage area may have a relatively large capacity so that, for example, a plurality of pages, objects, or partial images can be stored. By securing a large-capacity image storage area in this way, the storage unit 19 can average the rasterization processing time and secure the continuous operation of the final image formation.

Furthermore, the storage unit 19 also stores the user's account settings. Further, the storage unit 19 may include an area of a storage folder for each user.

In addition, in the image forming apparatus 1, the control unit 10 and the image processing unit 11 may be integrally formed such as a CPU having built-in GPU, a chip-on module package, and an SOC (System On a Chip).

Further, the control unit 10 and the image processing unit 11 may have a built-in RAM, ROM, flash memory, or the like.

[Functional Configuration of Image Forming Apparatus 1]

Here, with reference to FIG. 2, the functional configuration of the image forming apparatus 1 is described. The control unit 10 and the image processing unit 11 of the image forming apparatus 1 include a division unit 100, an analysis unit 110, a compression unit 120, a decompression unit 130, a processing execution unit 140, and an adjusting unit 150.

The storage unit 19 stores image data 200, partial data 210, and band data 220.

The division unit 100 divides image data 200, which is inputted, into a plurality of partial data 210.

The analysis unit 110 analyzes whether or not each of a plurality of the partial data 210 divided by the division unit 100 is suitable for compression at any of a plurality of stages of image processing in which the feature value of the image changes.

The compression unit 120 compresses the partial data 210 at the stage analyzed by the analysis unit 110 as being suitable for compression. The compression unit 120 selects a compression type according to this stage. The compression unit 120 may include an entropy encoder that maximizes the compression efficiency by using a code length corresponding to the appearance probability of each code.

The compression unit 120 can include the type information 300 indicating the selected compression type in the compressed partial data 210.

The decompression unit 130 decompresses the partial data 210 compressed by the compression unit 120 at the stage when it is compressed. The decompressing unit 130 can decompress based on the type information 300.

The processing execution unit 140 executes processing at the stage of image processing on the partial data 210 decompressed by the decompressing unit 130.

The processing execution unit 140 can also output the partial data 210 in which all the stages of processing have been completed to the image forming unit 17.

The adjusting unit 150 schedules each of the plurality of partial data 210 processed by the processing execution unit 140 to complete processing at almost the same time.

In the present embodiment, the image forming unit 17 forms an image of the band data 220, which the partial data 210 where the processing of all the stages has been completed is collected.

The image data 200 is data related to an image such as print data described in PDL (Page Description Language), which is a dedicated language for describing print pages, an electronic document such as PDF, or the like, a file for word processors, spreadsheets, presentation application software (hereinafter referred to as "application"), or the like, or a bitmap (hereinafter, also referred to as "raster") of the document read by the document reader 12, or the like. The image data 200 may be either vector data that the coordinates on the page are specified or raster image data that is a set of pixels.

The partial data 210 is image data of a partial area in which the image data 200 is divided into specific units. In the present embodiment, the partial data 210 may be data in which the image data 200 converted into raster data by the rasterization step processing of the image processing as described later is divided into rectangular areas.

In addition, the partial data 210 includes the type information 300. The type information 300 is information for selecting the type of compression. As the type of compression, lossy compression, lossless compression, or the like, is selected. In the lossy compression and lossless compression, various compression types such as Run Length Encoding, Huffman coding, DCT (Discrete Cosine Transform), and compression combined with wavelet transform, or the like, can be selected according to the feature value of the image.

The band data 220 is image data in which the image data 200 of the CMYK (Cyan, Magenta, Yellow, and Key plate (black)), which is raster data, is converted into a halftone image. In the case of color printing, the band data 220 is generated in an amount that can be recorded on the recording paper at one time by the image forming unit 17 for each of the CMYK. On the other hand, in the case of monochrome printing, band data 220 of only K may be generated.

Here, the control unit 10 and the image processing unit 11 of the image forming apparatus 1 execute the control program stored in the storage unit 19 and is made to function as the division unit 100, the analysis unit 110, the compression unit 120, the decompression unit 130, and the processing execution unit 140, and the adjusting unit 150. Further, each part of the image forming apparatus 1 as described above becomes a hardware resource for executing the image forming method according to the present disclosure.

In addition, apart or any combination of the above-mentioned functional configurations may be configured in terms of hardware or circuit by IC, programmable logic, FPGA (Field-Programmable Gate Array), or the like.

[Adaptive Compressing Image Process by Image Forming Apparatus 1]

Figure 3:
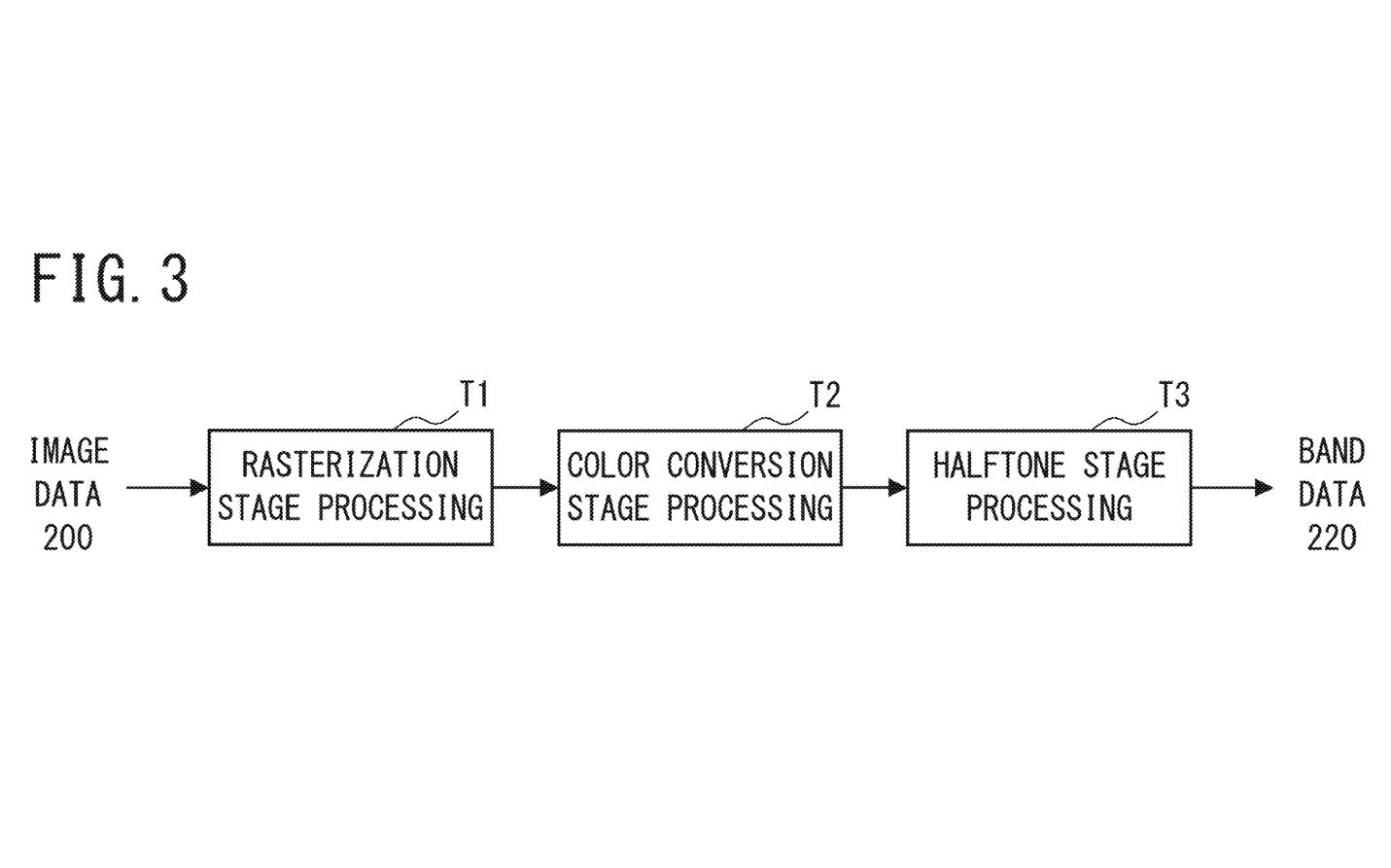
FIG. 3 is a conceptual diagram showing an example of processing at each stage of image processing according to the embodiment of the present disclosure.
Figure 4:
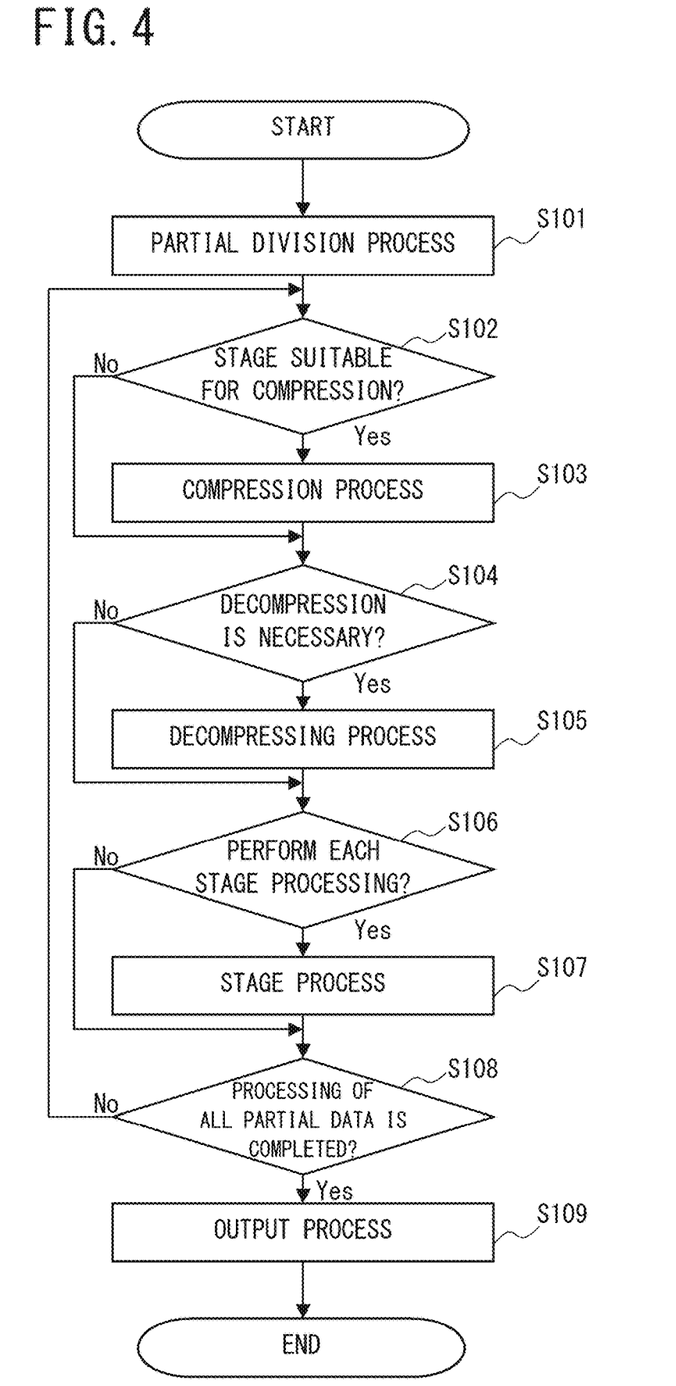
FIG. 4 is a flowchart of adaptive compressing image process according to the embodiment of the present disclosure.
Figure 5:
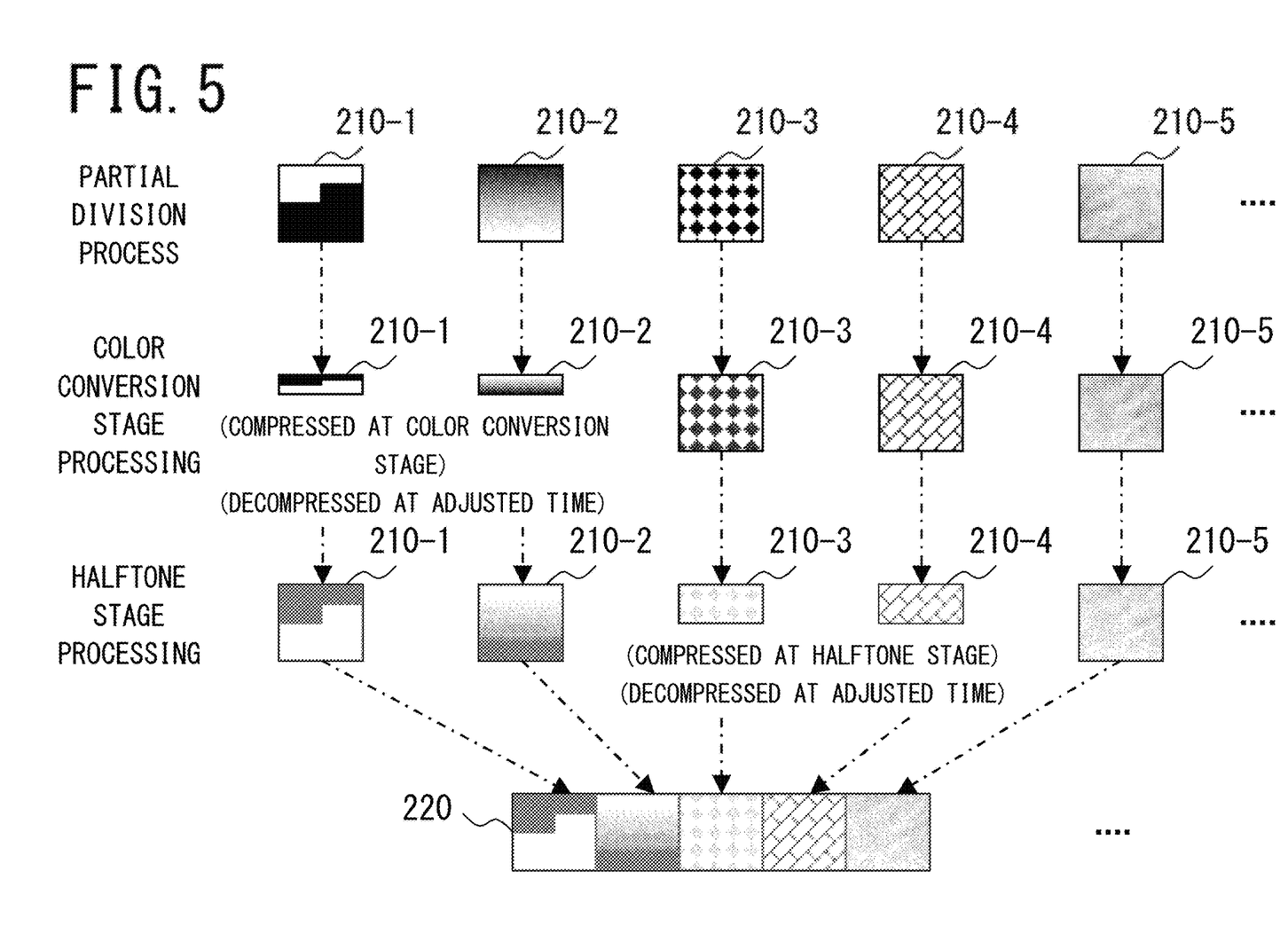
FIG. 5 is a conceptual diagram of the adaptive compressing image process as shown in FIG. 4.

Next, with reference to FIGS. 3 to 5, the adaptive compressing image process by the image forming apparatus 1 according to the embodiment of the present disclosure is described.

Firstly, with reference to FIG. 3, each stage of image processing according to the present embodiment is described. In the present embodiment, the image processing from the image data 200 is executed as a plurality of stages of processing. In the present embodiment, the plurality of stages of processing in the image processing include processing of a rasterization stage in stage T1, a color conversion stage in stage T2, and a halftone stage in stage T3, respectively.

The process of the rasterization step in the step T1 is a process of rasterizing the image data 200 including the vector data described in the page language such as PDL, or the like, which is inputted image data, and converting it into the raster image data 200. Here, in PDL, the processing amount of drawing processing differs for each page, and thus predicting the processing time is difficult. Specifically, in PDL, image processing objects may be expressed by overlapping or grouping, and thus in this case, it is necessary to draw in the same image area many times. Here, the efficiency of the image forming apparatus 1 becomes optimal when it operates continuously. Therefore, when printing is temporarily stopped due to shortage of storage capacity in the storage unit 19, it takes more time for the stop process and the restart process than the simple stop time. Therefore, it is necessary to secure a sufficient storage area in the storage unit 19 for rasterizing the PDL.

The process of the color conversion stage of the stage T2 is a process of converting a color space of the raster image data 200 of color for forming an image. In the present embodiment, a process of converting an RGB (Red Green Blue) color space into a CMYK color space is executed. At this time, it is also possible to adjust the density and gradation according to the set color table, or the like. That is, the processing of the color conversion stage may be further divided into a plurality of stages.

The process of the halftone stage of stage T3 is a process of converting an image into a spatial frequency that can be expressed by the image forming unit 17. In the present embodiment, a process of generating the band data 220 with 1-bit two-gradation (dot) or two-bit four-gradation is executed by a technology such as dithering method or error diffusion method.

Here, in the present embodiment, in the processing of these stages, the inputted image data 200 is divided into a plurality of partial data 210. Then, each of the plurality of partial data 210 is compressed according to the feature value of the image at each stage and is temporarily stored in the image storage area of the storage unit 19. That is, compression and decompression are executed for each partial data 210 while performing image processing in each stage. This temporarily stored data is decompressed as necessary to perform the processing at the stage when it is compressed. That is, while scheduling, after compression and decompression, the same processing as in the case of no compression is executed. Thereby, efficient image formation can be realized.

In the adaptive compressing image process according to the present embodiment, the control unit 10 and the image processing unit 11 mainly execute the program stored in the storage unit 19 in cooperation with each unit and use the hardware resources.

Hereinafter, with reference to the flowchart of FIG. 4, the details of the adaptive compressing image process according to the present embodiment is described step by step.

(Step S101)

At first, the division unit 100 performs a partial division process. Here, image data 200 such as PDL is inputted from the external terminal, processing in the rasterization stage of T1 in FIG. 3 is performed, and the raster image data 200 is stored in the storage unit 19.

Alternatively, the document is read by the document reading unit 12, the raster image data 200 is inputted, and it is stored in the storage unit 19.

The division unit 100 divides the image data 200 stored in the storage unit 19 into a plurality of partial data 210, which is rectangular areas. For example, the division unit 100 divides the image data 200 into a square area having a size of N pixels*N pixels as the rectangular area. The square area can increase the possibility that similar pixels is contained in the same partial data 210, and it is suitable for the image data for the image forming apparatus 1. Here, the number of pixels, "N", may correspond to a number that is easy to process an image, such as a multiple of "8". In addition, the "N" in this rectangular area may be different or the same between the color conversion stage and the halftone stage. If they are different, "N" in the color conversion stage may be magnified several times to ten times in the halftone stage, and dithering, or the like, may be performed.

According to FIG. 5, an example in which the image data 200 is divided into partial data 210-1 to partial data 210-n is shown. Here, the partial data 210-1 to the partial data 210-5 are shown.

(Step S102)

Next, the analysis unit 110 determines whether or not the stage is suitable for compression.

The analysis unit 110 analyzes whether or not each of the plurality of partial data 210 stored in the storage unit 19 is suitable for compression at any of the plurality of stages of image processing.

As refer to FIG. 5, an analysis whether or not it is suitable for compression at each stage by the analysis unit 110 is described.

The analysis unit 110 analyzes the features of the image of the partial data 210 at the beginning of each stage in the plurality of stages of image processing. On this basis, the analysis unit 110 analyzes whether or not compression can be optimally performed according to the feature value of the partial data 210. At this time, the analysis unit 110 evaluates at least a part of the partial data 210 and determines whether or not it should be compressed before the stage.

Specifically, in the present embodiment, the feature value of the image of the partial data 210 changes particularly between the processing in the color conversion stage and the processing in the halftone stage. Therefore, the analysis unit 110 determines whether or not to compress at any of these stages. That is, the analysis unit 110 determines whether the compression of each partial data 210 is suitable before and after the processing of the color conversion step or before and after the processing of the halftone step.

Specifically, at first, the analysis unit 110 determines whether or not it is suitable for compression at a stage before or after the color conversion. At this stage, for example, in the image of the partial data 210, each color has a large amount of data such as RGB or CMYK for each pixel, 8 bits to 16 bits, or the like, respectively. That is, in the present embodiment, the amount of data of the partial data 210 is larger in the color conversion stage than in the halftone stage, especially when the "N" in the rectangular area as described above is not changed depending on the stage.

However, if the partial data 210 has a small complexity (entropy) as an image feature value such as only the same color, coloring separately, gradation, or the like, there is a high possibility that the size is reduced if compressed. Therefore, when the analysis unit 110 determines that the complexity of the partial data 210 is lower than the specified threshold value, it can determine that it is suitable for compression before or after the color conversion.

In addition, the analysis unit 110 can also calculate this image feature value while partially executing the compression process as described later.

On the other hand, when the partial data 210 is an image such as a photograph, the complexity becomes large as an image feature value. In this case, if compression is performed at the color conversion stage, the compression efficiency is not better. Therefore, the analysis unit 110 determines whether or not it is suitable for compression at the stage before or after the halftone. Here, as described above, the number of bits of the partial data 210 processed in the halftone stage is reduced from that before the processing in the halftone stage to about 1 bit or 2 bits for each color. However, in the halftone stage, the process of repeating the stippled shades is performed even in the area filled with the "same" color. Therefore, the analysis unit 110 determines whether or not such shading can be compressed with high compression efficiency, that is, whether or not it is suitable for compression.

That is, the analysis unit 110 determines whether or not it is suitable for compression both before and after the halftone for each rectangular area of the partial data 210 in the page.

Further, the analysis unit 110 can also determine whether it is suitable for compression by considering the remaining capacity of the image storage area, restrictions on the speed of image processing due to the transfer speed and read/write speed of the HDD, or the like, in addition to the image feature value of the partial data 210.

FIG. 5 shows an example in which the analysis unit 110 determines that the partial data 210-1 and the partial data 210-2 are suitable for compression at the color conversion stage.

On the other hand, the analysis unit 110 determines that the partial data 210-3 and the partial data 210-4 are suitable for compression at the halftone stage.

Further, the analysis unit 110 determines that the partial data 210-5 is not suitable for compression at any stage. In this case, the partial data 210-5 is not compressed as a "through process", and the processing of each stage is executed as it is.

The analysis unit 110 determines Yes if the stage is suitable for compression. The analysis unit 110 determines No in other cases, that is, it is a case better to execute the process at the stage without compression.

In the case of Yes, the analysis unit 110 advances the process to step S103.

In the case of No, the analysis unit 110 advances the process to step S104.

(Step S103)

If the stage is suitable for compression, the compression unit 120 performs the compression process. The compression unit 120 compresses the partial data 210 at a stage analyzed by the analysis unit 110 as being suitable for compression. That is, as described above, the compressed partial data 210 is output before or after any of the plurality of stages of image processing. If compression is selected, the compression unit 120 operates, and the partial data 210 is compressed by the compression unit 120 instead of processing at each stage of image processing, and the compressed data is stored in the storage unit 19.

In the present embodiment, an appropriate compression method is selected for each of the plurality of divided rectangular areas. As a result, the compression unit 120 can output the partial data 210 so as to minimize the amount of data.

More specifically describing with reference to FIG. 5, in this example, the partial data 210-1 and the partial data 210-2 are determined that they are suitable for compression at the color conversion stage. In this case, the compression unit 120 selects the type of compression based on the feature that nearby images often have exactly the same color in the image data 200 for printing in the image forming apparatus 1.

Specifically, the compression unit 120 may be able to select, for example, lossy compression as the type of compression. In this lossy compression, for example, partial data 210 is frequency-analyzed by DCT or wavelet, and compression is performed by coding based on the result. More specifically, since it is difficult to visually recognize a slight color difference in a high frequency image, the number of bits applied to that portion is reduced, and the compression rate is increased. As described above, in the color conversion stage, lossy compression based on the color difference is likely to be performed.

Alternatively, if only the same color, the coloring separately, or the like, is in the image feature value, the compression unit 120 may simply select RLE (Run Length Encoding), Huffman coding, or the like, because of focusing only on the continuation of colors in the partial data 210.

As described above, when the pre-halftone compression is selected, the optimum compression is performed based on the analysis of the image feature value by the analysis unit 110.

On the other hand, in the example of FIG. 5, the partial data 210-3 and the partial data 210-4 are determined to be suitable for compression in the processing at the halftone stage. In this case, the compression unit 120 can be compressed by Huffman coding, or the like, for example, before the execution of the halftone stage processing and at the stage where not being the gradation of the bit sequence. In this case as well, it is possible to perform any type of compression, lossy compression, or lossless compression, as in the color conversion step as described above.

Alternatively, the compression unit 120 can compress the partial data 210 that becomes the gradation of the bit sequence after the halftone stage processing is executed. In this case, especially when the above-mentioned "N" in the rectangular area is not changed depending on the stage, the storage capacity of the partial data 210 is smaller after the halftone stage processing than in the color conversion stage. Specifically, it becomes about ¼. However, the above-mentioned lossy compression is not suitable for data such as the gradation of the bit sequence. Therefore, lossless compression by using Huffman coding, or the like, is performed. Nevertheless, even if lossless compression is performed on the gradation of the bit sequence, the compression rate is often not higher than that of the partial data 210 suitable for the color conversion stage. Specifically, the compression unit 120 can compress the partial image data 210 after the halftone stage processing at a compression rate of, for example, about ¼ to ⅛. That is, in this case, in the above-mentioned analysis process, the analysis unit 110 uses this value as the threshold value and determines that it is more suitable than the compression before halftone.

The compression unit 120 temporarily stores these compressed partial data 210 in the image storage area of the storage unit 19.

At this time, the compression unit 120 includes the compression type information 300 in the compressed partial data 210. As a result, it is possible to appropriately decompress and execute each process.

(Step S104)

Here, the adjusting unit 150 determines whether or not decompression is necessary. The adjusting unit 150 schedules so that each of the plurality of partial data 210 can be processed (抜け「完了する」) at the same time. According to this scheduling, the adjusting unit 150 determines Yes for each compressed partial data 210 when the timing requires decompress. The adjusting unit 150 determines No when it is not compressed or does not yet need to be decompressed.

In the case of Yes, the adjusting unit 150 advances the process to step S105.

In the case of No, the adjusting unit 150 advances the process to step S106.

(Step S105)

If decompressing is required, the decompressing unit 130 performs decompressing process. The decompressing unit 130 decompresses the compressed partial data 210 at the stage when it is compressed. Therefore, the decompressing unit 130 reads out the type information 300 of the partial data 210 to be decompressed and determines the stage of the compressed image processing. The decompressing unit 130 decompresses based on this. At this time, the decompression unit 130 can decompress the partial data 210 by, for example, the reverse processing at the time of compression. That is, in the case of lossless compression, the same partial data 210 as before compression is generated. On the other hand, when lossy compression is performed, partial data 210 is generated in which information is not lost, visually.

(Step S106)

Here, the adjusting unit 150 determines whether or not to perform the processing in each stage. For the partial data 210 that is compressed or decompressed or the partial data 210 that is not compressed or decompressed, the adjusting unit 150 determines Yes if the timing is appropriate for executing the processing of each stage of the image processing by scheduling. This appropriate timing may be the timing, for example, when it is estimated that the band data 220 is generated almost at the same time by the calculation resources of the control unit and the image processing unit 11, the speed of image processing according to the remaining capacity of the image storage area of the storage unit 19, or the like. Specifically, the adjustment unit 150 speeds up the timing when there is enough capacity in the calculation resource, the remaining capacity of the image storage area, and the like. In other cases, the adjusting unit 150 may delay the timing by giving priority to the compression of the partial data 210. That is, it is possible to complete the processing of each stage of image processing at the same time while performing compression and decompression. In addition, even in the case of not being compressed as in the partial data 210-5 in FIG. 5, since the processing of each stage of image processing is indispensable for generating the band data 220, the adjusting unit 150 may set the timing according to such partial data 210.

On the other hand, the adjusting unit 150 determines No when the timing has not yet been reached.

In the case of Yes, the adjusting unit 150 advances the process to step S107.

In the case of No, the adjusting unit 150 advances the process to step S108.

(Step S107)

If it is determined that the image processing of each stage is performed, the processing execution unit 140 performs the stage process.

The processing execution unit 140 executes processing at the relevant stage of image processing on the partial data 210.

Specifically, since the image compressed in the upstream stage has not been processed in the subsequent image processing stages, the image processing is restarted from an appropriate stage.

If the compression is performed before the processing of the color conversion stage, the processing execution unit 140 executes the processing of the color conversion stage.

On the other hand, if the compression is performed after the processing of the color conversion stage, the processing of the halftone stage has not been executed yet. Therefore, the processing execution unit 140 executes the processing in the halftone stage. Further, if the compression is performed after the halftone stage processing, the processing execution unit 140 may skip the halftone stage processing because it is unnecessary.

(Step S108)

Here, the adjusting unit 150 determines whether or not the processing of all the parts has been completed. The adjusting unit 150 determines Yes if the processing of the halftone stage for all the partial data 210 is completed. In other cases, the adjusting unit 150 determines No.

In the case of Yes, the adjusting unit 150 advances the process to step S109.

In the case of No, the adjusting unit 150 returns the processing to step S102, continues the compression, decompression, and each stage processing for each partial data 210 according to the scheduling.

(Step S109)

If the processing of all the parts is completed, the processing execution unit 140 and the image forming unit 17 perform output process. In the present embodiment, the processing execution unit 140 finally collects each partial data 210 to generate band data 220 of each color of CMYK. That is, the processing execution unit 140 collects the partial data 210, which is gradation of the bit sequence, and converts the collected partial data 210 into band data 220, which is a unit where the image forming unit 17 forms an image. This band data 220 is not restored to the original image, but it becomes restored to the halftone processed version of the original image. The generation of the band data 220 is adjusted so as to be substantially simultaneous by scheduling.

The processing execution unit 140 transmits the generated band data 220 to the image forming unit 17. Upon receiving this, the image forming unit 17 forms an image of the band data 220 on the recording paper.

This completes the adaptive compressing image process according to the embodiment of the present disclosure.

As configured in this way, the following effects can be obtained. Typically, when the image data is uniformly compressed, the storage capacity may not be efficiently used in the entire image processing due to the storage capacity, transfer speed, read/write speed, or the like, in the storage area of the recording medium.

On the other hand, the image forming apparatus 1 according to the embodiment of the present disclosure includes a division unit 100 that divides inputted image data 200 into a plurality of partial data 210; an analysis unit 110 that analyzes whether or not suitable for compression for each of the plurality of partial data 210 divided by the divided unit 100 in any one of plurality of stages of image processing where feature value of image changes; a compression unit 120 that compresses partial data 210 at a stage when analyzed by the analysis unit 110 as being suitable for compression; a decompression unit 130 that decompresses the partial data 210 compressed by the compression unit 120 at the stage when compressed; a processing execution unit 140 that executes processing at the stage of the image processing on the partial data 210 decompressed by the decompression unit 130; and an image forming unit 17 that collectively forms an image of the partial data 210 for which the processing at the stage has been completed.

With such a configuration, it is possible to provide an image processing apparatus capable of efficiently executing image processing in terms of storage capacity and processing speed. Specifically, the image forming apparatus 1 according to the embodiment of the present disclosure can achieve an excellent compression ratio in a specific image processing field. Thus, the process is executed with the smaller storage capacity of the storage unit 19, writing and reading of data to or from the storage unit 19 becomes more efficient, and it can be speeded up. As a result, an image can be formed on the recording paper at a higher speed.

Further, in a typical image processing apparatus, image processing for a specific application suitable for the target image forming process is executed. In this case, generally, image processing is performed in the direction in which the size of the data becomes smaller. However, in these image processing for specific applications, the feature value of the original image are often lost.

On the other hand, the image forming apparatus 1 according to the present embodiment compresses when determined to be suitable at each stage of a series of image processing. Therefore, a result different from uniformly performing compression for a specific application can be obtained. That is, even if lossy compression is performed, deterioration of image quality due to compression can be minimized.

In addition, there is no need for special devices, circuits, or the like, that suppress image quality deterioration when uniformly compressing for specific applications. Therefore, the control unit 10 and the image processing unit 11 can perform compression, or the compression circuit in ASIC can be used for compression, which is advantageous in terms of cost.

The image processing apparatus according to the embodiment of the present disclosure is further provided with an adjusting unit 150 that schedules each of the plurality of partial data 210 processed by the processing execution unit 140 to complete processing at the same time.

With this configuration, the storage capacity of the storage unit 19 can be effectively used, suppress unevenness in the processing time, and continuously form the image. As a result, the image on the recording paper can be formed at high speed.

Further, in the image forming apparatus 1 according to the embodiment of the present disclosure, the compression unit 120 includes the compression type information 300 in the compressed partial data 210, and the decompression unit 130 decompresses based on the type information 300.

With this configuration, decompression can be performed, reliably, based on the type information 300 even if compression is performed at any of the plurality of stages of image processing.

Further, in the image forming apparatus 1 according to the embodiment of the present disclosure, the plurality of stages of image processing includes a rasterization step, a color conversion step, and a halftone step.

With this configuration, when the image feature value changes, appropriate compression can be performed at the optimum stage, and the storage capacity, processing time, and the like, can be made efficient.

OTHER EMBODIMENTS

In the above-described embodiment, an example of dividing the raster image data 200 into partial data 210 in a rectangular area has been described.

However, as the image forming apparatus 1 according to another embodiment of the present disclosure, the division unit 100 divides into a partial data 210, which is a rectangular area, when the image data 200 including only raster data and divides into the partial data 210, which is a region other than the rectangular area, when the image data 200 including vector data.

Further, the dividing unit 100 may divide the image data 200 without specifying the coordinate position of the image data 200. In this case, the division unit 100 may be divided into partial data 210, which attributes to the region where the coordinates overlap, or partial data 210, which attributes not to any region.

Further, when the image data 200 is a vector image, the division unit 100 may divide the image data 200 in object units. The division unit 100 may separately divide the raster image data 200 where this vector image is rendered into partial data 210.

With this configuration, when vector images are included, even if vector images overlap each other, they can be appropriately compressed and final image formation can be performed. As a result, the image in the rasterization stage can be divided. Further, the image even if it is converted into a vector image in the middle stage process of the image processing can be divided. Therefore, it is possible to support a flexible configuration.

In addition, in the above-described embodiment, an example in which partial data 210 of a square area of N pixels*N pixels is used for a rectangular area of the raster image data 200 has been described.

However, the shape of the partial data 210 does not have to be rectangular. Specifically, other shapes can be used according to the processing at each stage. For example, the shape of the partial data 210 may be one pixel, two pixels, or the like, in the vertical direction, and it may be elongated in the horizontal direction. Alternatively, as the partial data 210, a set of pixels such as a polygon area specified by coordinates, an area divided by the edge obtained by edge extraction processing, or the like, may be used.

In the above-described embodiment, an example of compressing the partial data 210 before or after the processing of the halftone step is described.

However, the halftone stage processing itself may be used as compression. That is, the process of converting the partial data 210 to the gradation of the bit sequence itself may be used as compression. Further, converting the gradation of the bit sequence to CMYK or RGB color may be performed as decompression. In this case, although the original image is not restored even if it is decompressed, it is possible to obtain a smooth image effect by reducing dithering noise, block noise, or the like. Further, since the image forming apparatus 1 only uses the halftone processing required for normal image processing, no additional circuit, or the like, is required, so that the cost can be reduced.

In the above-described embodiment, an example in which the analysis unit 110 analyzes the image feature value and then compresses the image is described.

However, in the stage that the compression unit 120 partially executes the compression process of the partial data 210, if the compression ratio becomes higher than the threshold value, it may be determined that it is suitable for compression.

With this configuration, if the compression rate becomes high, it can be compressed as it is, and the analysis by the analysis unit 110 becomes unnecessary, so that the efficiency can be improved. On the other hand, if the compression rate is low, it is possible to stop the compression, restore the original partial data 210, and proceed to the next stage of processing. Thus, consequently, it becomes possible to determine at which stage compression is suitable.

Further, instead of the analysis unit 110 analyzing the image feature value in advance, the compression unit 120 may be able to try all types of compression methods and determine which is suitable or not suitable. In this case, an increase in processing time can be avoided by executing in parallel and speculatively by using a dedicated arithmetic resource by a circuit such as an ASIC, or the like. Alternatively, when the control unit 10 executes a plurality of compression methods in this way, arithmetic resources are required. Therefore, the control unit 10 may be executed in the free time depending on the status of other processing. This makes it possible to suppress an increase in processing time.

In the above-described embodiment, an example in which both lossy compression and lossless compression are used is described. However, the configuration may be such that only one of lossy compression and lossless compression is used.

Further, in the above-described embodiment, an example is described in which the compressed and then decompressed partial data 210 is processed at the stage of compression. However, the compressed partial data 210 may be decompressed at different stages. That is, different stages of processing may be executed before compression and after decompression. For example, the partial data 210 compressed before the processing in the color conversion step may be configured to perform halftone processing immediately after decompression. Also in this case, the RGB color may be converted to the CMYK color at the time of halftone. Further, it is possible to perform a configuration in which the halftone stage processing is directly performed while decompressing.

With this configuration, image processing can be made more efficient and faster according to the remaining capacity of the image storage area, restrictions on the speed of image processing, or the like.

In the above-described embodiment, an example in which the image forming apparatus 1 is an image processing apparatus has been described.

However, it is also possible to execute at least a part of each of the above-mentioned processes on an external terminal, a server, a service on a so-called cloud, or the like.

Further, the present disclosure can be applied to an information processing apparatus other than the image forming apparatus. That is, a network scanner, a server, or the like, to which the scanner is separately connected by USB, or the like, may be used.

Further, it goes without saying that the configuration and operation of the above-described embodiment are examples and can be appropriately modified and executed without departing from the aim of the present disclosure.

What is claimed is:

1. An image processing apparatus comprising:
a division unit configured to divide inputted image data into a plurality of partial data;
an analysis unit configured to determine whether or not each of the plurality of partial data divided by the division unit is suitable for compression in each stage of a plurality of stages of image processing in which feature value of image changes when performing the respective image processing, wherein the plurality of stages includes a color conversion stage and a halftone stage;
a compression unit configured to compress the partial data determined to be suitable for compression at a stage when determined by the analysis unit as being suitable for compression;
a decompression unit configured to decompress the partial data compressed by the compression unit at the stage when compressed; and
a processing execution unit configured to execute processing at the stage of the image processing on the partial data decompressed by the decompression unit; wherein
the analysis unit determines that the partial data is suitable for compression in the color conversion stage when the compression efficiency is higher in the compression in the color conversion stage than in the compression in the halftone stage.

2. The image processing apparatus according to claim 1, further comprising:
an adjusting unit configured to schedule each of the plurality of partial data processed by the processing execution unit to complete processing at the same time,
wherein the adjusting unit is configured to cause the processing execution unit to execute processing on the partial data at timing estimated to be an approximate timing such that that respective band data produced from the plurality of partial data will be generated at the same time by a calculation resource of a control unit based on speed of image processing according to remaining capacity of an image storage area of a storage unit.

3. The image processing apparatus according to claim 1, wherein
the image processing apparatus is configured to perform a rasterization stage; and
in the rasterization stage, the division unit divides into a rectangular area when the image data including only raster data and divides into a region other than the rectangular area when the image data including vector data.

4. The image processing apparatus according to claim 1, wherein
the compression unit includes compression type information in compressed partial data, and
the decompression unit decompresses based on the type information.

5. The image processing apparatus according to claim 1, wherein
the plurality of stages of the image processing further includes a rasterization stage.

6. The image processing apparatus according to claim 1, wherein the compression unit performs lossless compression or lossy compression in the color conversion stage and lossy compression in the halftone stage.

7. The image processing apparatus according to claim 1, wherein the analysis unit determines to be suitable for compression by considering remaining capacity of image storage area and restrictions on image processing speed due to transfer speed and the read/write speed in a storage unit.

8. The image processing apparatus according to claim 1, wherein, the analysis unit determines suitable for compression for each of the plurality of partial data when the compression rate becomes higher than a threshold value at a stage where a compression process is partially executed by the compression unit.

9. The image processing apparatus according to claim 1, wherein the compression unit
executes a plurality of types of compression methods in parallel and speculatively, and
selects a suitable compression type.

10. An image forming apparatus comprising:
a division unit configured to divide inputted image data into a plurality of partial data from which image formation can be performed by an image forming unit;
an analysis unit configured to determine whether or not each of the plurality of partial data divided by the division unit is suitable for compression in any one of a plurality of stages of image processing in which feature value of image changes when performing the respective image processing, wherein the plurality of stages include a color conversion stage and a halftone stage;
a compression unit configured to compress the partial data determined to be suitable for compression at a stage when determined by the analysis unit as being suitable for compression;
a decompression unit configured to decompress the partial data compressed by the compression unit at the stage when compressed;
a processing execution unit configured to execute processing at the stage of the image processing on the partial data decompressed by the decompression unit; and
an image forming unit configured to collectively form an image of the partial data for which the processing at the stage has been completed;
wherein
the analysis unit determines that the partial data is suitable for compression in the color conversion stage when the compression efficiency is higher in the compression in the color conversion stage than in the compression in the halftone stage.

11. The image forming apparatus according to claim 10, further comprising:
an adjusting unit configured to schedule each of the plurality of partial data processed by the processing execution unit to complete processing at the same time;

wherein the adjusting unit is configured to cause the processing execution unit to execute processing on the partial data at timing estimated to be an approximate timing such that that respective band data produced from the plurality of partial data will be generated at the same time by a calculation resource of a control unit based on speed of image processing according to remaining capacity of an image storage area of a storage unit.

12. The image forming apparatus according to claim 10, wherein
the image processing apparatus is configured to perform a rasterization stage; and
in the rasterization stage, the division unit divides into a rectangular area when the image data including only raster data and divides into a region other than the rectangular area when the image data including vector data.

13. The image forming apparatus according to claim 10, wherein
the compression unit includes compression type information in compressed partial data, and
the decompression unit decompresses based on the type information.

14. The image forming apparatus according to claim 10, wherein
the plurality of stages of the image processing includes a rasterization stage.

15. An image forming method executed by an image processing apparatus, comprising the steps of:
dividing inputted image data into a plurality of partial data from which image formation can be performed;
determining whether or not each of the divided plurality of partial data is suitable for compression in any one of a plurality of stages of image processing where feature value of image changes when performing the respective image processing, wherein the plurality of stages include a color conversion stage and a halftone stage;
compressing the partial data determined to be suitable for compression at a stage when determined as being suitable for compression;
decompressing the compressed partial data at the stage when compressed;
executing processing at the stage of the image processing on the decompressed partial data; and
collectively forming an image of the partial data for which the processing at the stage has been completed;
wherein
the step of determining comprises determining that the partial data is suitable for compression in the color conversion stage when the compression efficiency is higher in the compression in the color conversion stage than in the compression in the halftone stage.

16. The image processing method according to claim 15, further comprising a step of:
scheduling each of processed plurality of partial data to complete processing at the same time.

17. The image processing method according to claim 15, further comprising
performing a rasterization stage comprising dividing into a rectangular area when the image data including only raster data and divides into a region other than the rectangular area when the image data including vector data.

18. The image processing method according to claim 15, wherein
the method comprises including compression type information in compressed partial data, and
decompressing based on the type information.

19. The image processing method according to claim 15, wherein
the plurality of stages of the image processing includes a rasterization stage.

* * * * *